US012682504B2

(12) United States Patent
Lee et al.

(10) Patent No.: US 12,682,504 B2
(45) Date of Patent: Jul. 14, 2026

(54) METHOD AND APPARATUS FOR MESH COMPRESSION BY USING OCTREE-BASED TRISOUP CODING

(71) Applicants: HYUNDAI MOTOR COMPANY, Seoul (KR); KIA CORPORATION, Seoul (KR); DIGITALINSIGHTS INC., Seoul (KR)

(72) Inventors: Jong Seok Lee, Seoul (KR); Yong Jo Ahn, Seoul (KR); Jin Heo, Yongin-si (KR); Seung Wook Park, Yongin-si (KR)

(73) Assignees: HYUNDAI MOTOR COMPANY, Seoul (KR); KIA CORPORATION, Seoul (KR); DIGITALINSIGHTS INC., Seoul (KR)

( * ) Notice: Subject to any disclaimer, the term of this patent is extended or adjusted under 35 U.S.C. 154(b) by 188 days.

(21) Appl. No.: 18/823,996

(22) Filed: Sep. 4, 2024

(65) Prior Publication Data

US 2024/0428467 A1 Dec. 26, 2024

Related U.S. Application Data

(63) Continuation of application No. PCT/KR2023/002519, filed on Feb. 22, 2023.

(30) Foreign Application Priority Data

Mar. 21, 2022 (KR) ........................ 10-2022-0034746
Feb. 15, 2023 (KR) ........................ 10-2023-0020089

(51) Int. Cl.
*G06T 9/00* (2006.01)
*G06T 9/20* (2006.01)
(Continued)

(52) U.S. Cl.
CPC ................ *G06T 9/001* (2013.01); *G06T 9/20* (2013.01); *G06T 9/40* (2013.01); *H04N 19/184* (2014.11)

(58) Field of Classification Search
CPC .. G06T 9/001; G06T 9/20; G06T 9/40; H04N 19/184
See application file for complete search history.

(56) References Cited

U.S. PATENT DOCUMENTS

| | | | | |
|---|---|---|---|---|
| 2010/0207941 A1* | 8/2010 | Lee | ............................ | G06T 9/40 |
| | | | | 382/233 |
| 2014/0184430 A1* | 7/2014 | Jiang | ......................... | G06T 9/40 |
| | | | | 341/55 |
| 2022/0159312 A1 | 5/2022 | Oh et al. | | |

FOREIGN PATENT DOCUMENTS

| | | |
|---|---|---|
| KR | 2006-0042947 A | 5/2006 |
| KR | 2014-0056290 A | 5/2014 |

(Continued)

OTHER PUBLICATIONS

International Search Report and Written Opinion for Int. App. No. PCT/KR2023/002519, mailed May 31, 2023.

*Primary Examiner* — Molly Wilburn
*Assistant Examiner* — Daniella M. DiGuglielmo
(74) *Attorney, Agent, or Firm* — MCDONNELL BOEHNEN HULBERT & BERGHOFF LLP

(57) ABSTRACT

A method and an apparatus for mesh compression utilizing octree-based trisoup coding includes encoding vertices of a mesh by using octree-based trisoup coding to increase coding efficiency for a three-dimensional mesh. The encoding/decoding method and the apparatus encode attribute information based on the information used in the trisoup coding to compress/reconstruct the three-dimensional mesh.

17 Claims, 10 Drawing Sheets

(51) Int. Cl.
    G06T 9/40     (2006.01)
    H04N 19/184     (2014.01)

(56)              References Cited

FOREIGN PATENT DOCUMENTS

| | | | |
|---|---|---|---|
| KR | 2015-0060247 A | 6/2015 | |
| KR | 2021-0134049 A | 11/2021 | |
| WO | WO-2020190093 A1 * | 9/2020 | ............ H04N 19/96 |
| WO | WO-2021029511 A1 * | 2/2021 | ............ H04N 19/96 |

* cited by examiner x-y plane x-z plane y-z plane y-z plane

Trisoup vertex

Trisoup edge

Current node

Z

Y

X

METHOD AND APPARATUS FOR MESH COMPRESSION BY USING OCTREE-BASED TRISOUP CODING

CROSS REFERENCE TO RELATED APPLICATIONS

This application is a continuation of International Application No. PCT/KR2023/002519 filed on Feb. 22, 2023, which claims priority to and the benefit of Korean Patent Application No. 10-2022-0034746 filed on Mar. 21, 2022, and Korean Patent Application No. 10-2023-0020089, filed on Feb. 15, 2023, the entire contents of each of which are incorporated herein by reference.

TECHNICAL FIELD

The present disclosure relates to a mesh compression method and an apparatus utilizing octree-based trisoup coding.

BACKGROUND

The statements in this section merely provide background information related to the present disclosure and do not necessarily constitute prior art.

Three-dimensional triangle soup or trisoup mesh information is a type of data that is widely used in various fields such as three-dimensional modeling, navigation, and gaming. Generally, three-dimensional trisoup mesh data includes geometry information and attribute information. Here, geometry information can include three-dimensional coordinates of vertices corresponding to the vertices of the triangular representation, edge information expressing the connectivity of vertices, and the like. The attribute information can include color information, such as RGB, per vertex. Alternatively, the attribute information when the attribute information is related to vertices generated by projecting a trisoup mesh plane into the uv domain, may include a texture map resulting from padding the attribute values, e.g., color information of the projected vertices. If the attribute information is a texture map, the attribute information may further include, for each vertex, coordinates of the texture map in the uv domain.

Prior mesh compression techniques suffer from mismatching of the encoding/decoding units between geometry information and attribute information when the geometry information and the attribute information are encoded/decoded. Therefore, there is a need for a method and device for efficiently compressing a mesh in terms of processing geometry information and attribute information.

SUMMARY

The present disclosure seeks to an encoding/decoding method and an apparatus for compressing/reconstructing a three-dimensional mesh by encoding vertices of a mesh by using octree-based trisoup coding to increase coding efficiency for the three-dimensional mesh. The encoding/decoding method and the apparatus encode attribute information based on the information used in the trisoup coding.

At least one aspect of the present disclosure provides a method performed by a mesh decoding device for decoding a mesh that is three-dimensional. The method includes separating a bitstream into a geometry bitstream and an attribute bitstream. The method also includes decoding edge information, vertex information, and octree partitioning information from the geometry bitstream. Here, the octree partitioning information is generated by a mesh encoding device performing octree partitioning on three-dimensional coordinates of vertices contained in the geometry information of the mesh. The octree partitioning includes dividing a three-dimensional space by eight to produce eight nodes, and recursively dividing the three-dimensional space by further dividing each of the eight nodes, which is a cube, by eight to produce an octree comprising last nodes that are not further divided. The method also includes reconstructing, geometry information of the mesh by using the octree partitioning information, the edge information, and the vertex information. Here, the geometry information includes vertices at the last nodes of the octree, connection information of the mesh, and texture map coordinates. The method also includes reconstructing a texture map from the attribute bitstream by using a video decoding method. The method also includes synthesizing the mesh by combining the geometry information and the texture map.

Another aspect of the present disclosure provides a method performed by a mesh encoding device for encoding a mesh that is three-dimensional. The method includes obtaining geometry information and attribute information of the mesh. The method also includes generating octree partitioning information by performing octree partitioning on three-dimensional coordinates of vertices contained in the geometry information. Here, the octree partitioning includes dividing a three-dimensional space by eight to produce eight nodes, and recursively dividing the three-dimensional space by further dividing each of the eight nodes, which is a cube, by eight to produce an octree comprising last nodes that are not further divided. The method also includes performing trisoup coding on the last nodes of the octree and then generating edge information and vertex information. The method also includes, for the last nodes, generating patches of the attribute information by using the octree partitioning information, the edge information, and the vertex information, and then packing the patches into node blocks in a texture map.

Yet another aspect of the present disclosure provides a computer-readable recording medium storing a bitstream generated by a mesh encoding method. The mesh encoding method includes obtaining geometry information and attribute information of a mesh that is three-dimensional. The mesh encoding method also includes generating octree partitioning information by performing octree partitioning on three-dimensional coordinates of vertices contained in the geometry information. Here, the octree partitioning includes dividing a three-dimensional space by eight to produce eight nodes, and recursively dividing the three-dimensional space by further dividing each of the eight nodes, which is a cube, by eight to produce an octree comprising last nodes that are not further divided. The mesh encoding method also includes performing trisoup coding on the last nodes of the octree and then generating edge information and vertex information. The mesh encoding method also includes, for the last nodes, generating patches of the attribute information by using the octree partitioning information, the edge information, and the vertex information, and then packing the patches into node blocks in a texture map.

As described above, the present disclosure provides an encoding/decoding method and an apparatus for compressing/reconstructing a three-dimensional mesh by encoding vertices of a mesh by using octree-based trisoup coding and by encoding attribute information based on the information used in the trisoup coding. Thus, the encoding/decoding method and the apparatus increase coding efficiency for the three-dimensional mesh.

DETAILED DESCRIPTION

Figure 1:
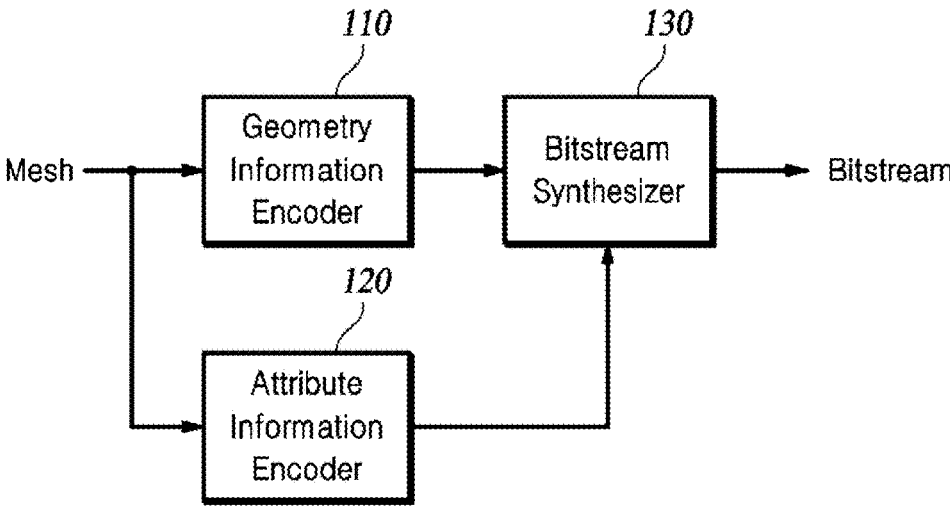
FIG. 1 is a block diagram conceptually illustrating a mesh encoding device.

Hereinafter, some embodiments of the present disclosure are described in detail with reference to the accompanying illustrative drawings. In the following description, like reference numerals designate like elements, although the elements are shown in different drawings. Further, in the following description of some embodiments, detailed descriptions of related known components and functions when considered to obscure the subject of the present disclosure may be omitted for the purpose of clarity and for brevity.

The present disclosure relates to a mesh compression method and an apparatus utilizing octree-based trisoup coding. More specifically, the present disclosure provides an encoding/decoding method and an apparatus that encode vertices of a mesh by using octree-based trisoup coding to increase coding efficiency for a three-dimensional mesh. The encoding/decoding method and the apparatus encode attribute information based on the information used in the trisoup coding to compress/reconstruct the three-dimensional mesh.

FIG. 1 is a block diagram conceptually illustrating a mesh encoding device.

The mesh encoding device encodes an inputted three-dimensional mesh to generate a bitstream. The mesh encoding device may include all or part of a geometry information encoder 110, an attribute information encoder 120, and a bitstream synthesizer 130.

The geometry information encoder 110 receives and then encodes the geometry information of the mesh to generate a geometry bitstream. At this time, the geometry information encoder 110 may use the Edgebreaker algorithm of DRACO. Alternatively, the geometry information encoder 110 may use the Triangle-FAN method of MPEG-AFX. The generated geometry bitstream may be transferred to the bitstream synthesizer 130.

The attribute information encoder 120 receives and then encodes the attribute information of the mesh to generate an attribute bitstream. In this case, when the attribute information is a texture map, the attribute information encoder 120 may use an image compression method such as PNG (Portable Network Graphics), JPEG (Joint Photographic coding Experts Group), JPEG2000, HEIF (High Efficiency Image File Format), or the like. Alternatively, the attribute information encoder 120 may use video encoding techniques such as H.264/AVC (Advanced Video Coding), H.265/HEVC (High Efficiency Video Coding), H.266/VVC (Versatile Video Coding), VP8, VP9, AV1, or the like. The generated attribute bitstream may be transferred to the bitstream synthesizer 130. Alternatively, if the attribute information of the mesh is present for each vertex, the attribute information encoder 120 may use attribute information compression methods of DRACO or MPEG-AFX.

The bitstream synthesizer 130 concatenates all of the received bitstreams to generate and then output one final bitstream.

Figure 2:
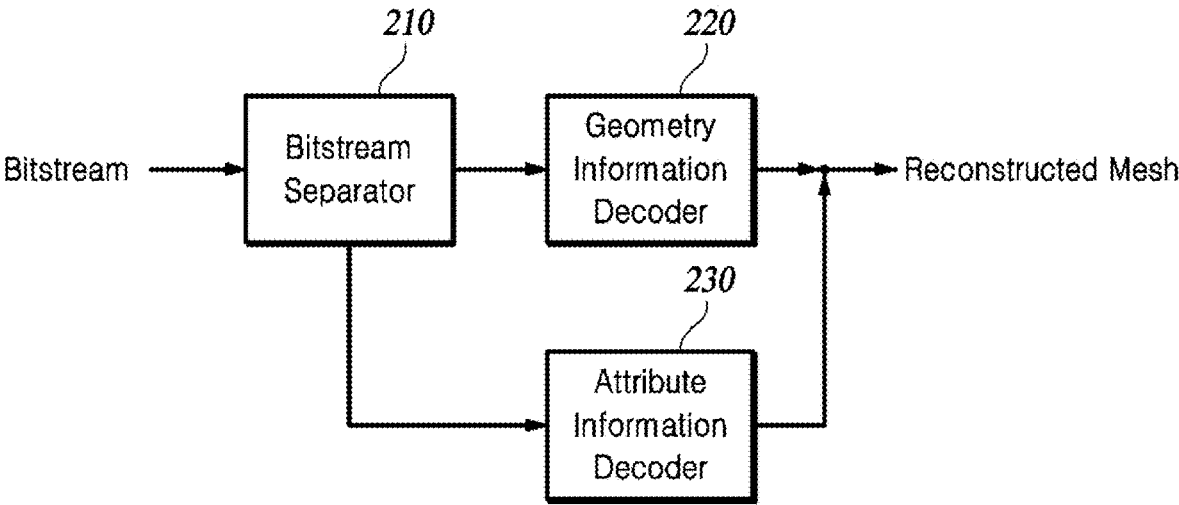
FIG. 2 is a block diagram conceptually illustrating a mesh decoding device.

FIG. 2 is a block diagram conceptually representing a mesh decoding device.

The mesh decoding device reconstructs a three-dimensional mesh from the inputted bitstream. The mesh decoding device may include all or part of a bitstream separator 210, a geometry information decoder 220, and an attribute information decoder 230.

The bitstream separator 210 receives and then separates the bitstream inputted into a geometry bitstream and an attribute bitstream. The geometry bitstream may be transferred to the geometry information decoder 220, and the attribute bitstream may be transferred to the attribute information decoder 230.

The geometry information decoder 220 decodes the inputted geometry bitstream to reconstruct the geometry information of the mesh.

The attribute information decoder 230 decodes the inputted attribute bitstream to reconstruct the attribute information of the mesh. The reconstructed attribute information and geometry information may be integrated and outputted in the form of a reconstructed mesh.

Figure 3:
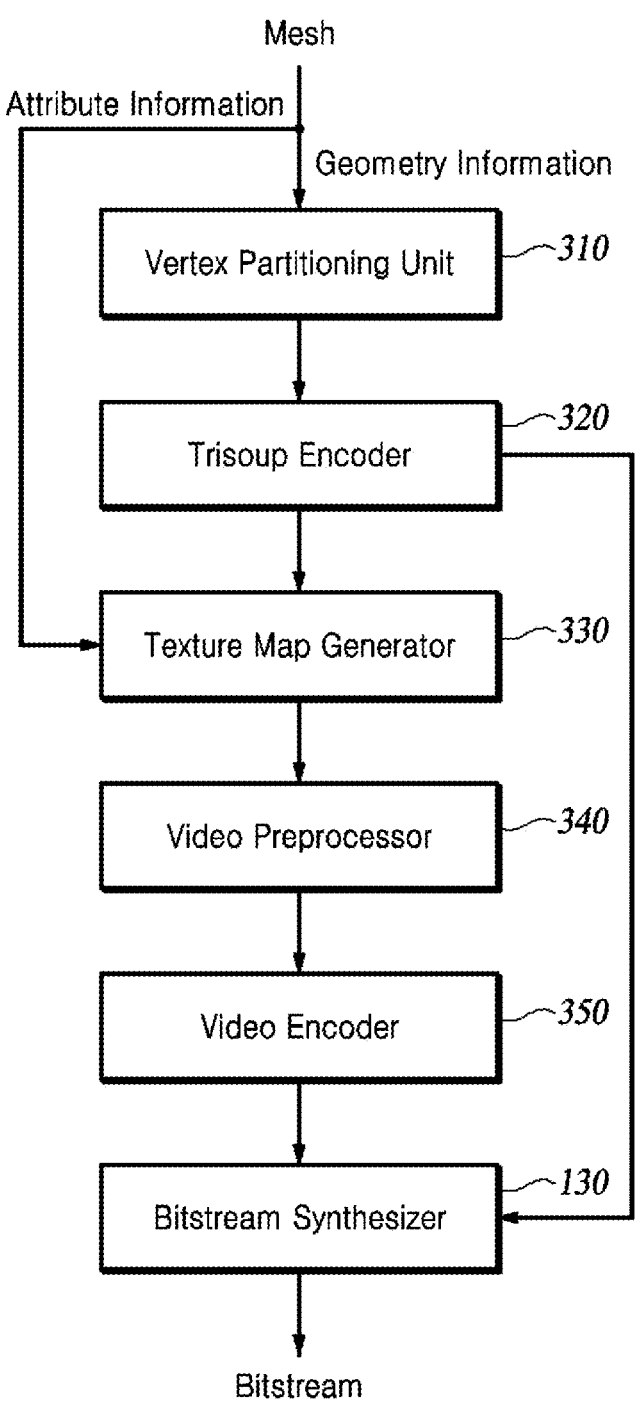
FIG. 3 is a diagram illustrating a mesh encoding device using trisoup coding, according to at least one embodiment of the present disclosure.

FIG. 3 is a diagram illustrating a mesh encoding device using trisoup coding, according to at least one embodiment of the present disclosure.

The mesh encoding device, according to at least one embodiment of the present disclosure, encodes an inputted three-dimensional mesh by using trisoup coding to generate a bitstream. The mesh encoding device may include all or part of a vertex partitioning unit 310, a trisoup encoder 320, a texture map generator 330, a video preprocessor 340, a video encoder 350, and a bitstream synthesizer 130.

The vertex partitioning unit 310 receives the geometry information of the mesh and then performs partitioning on the three-dimensional coordinates of the vertices from the geometry information of the mesh.

Figure 4:
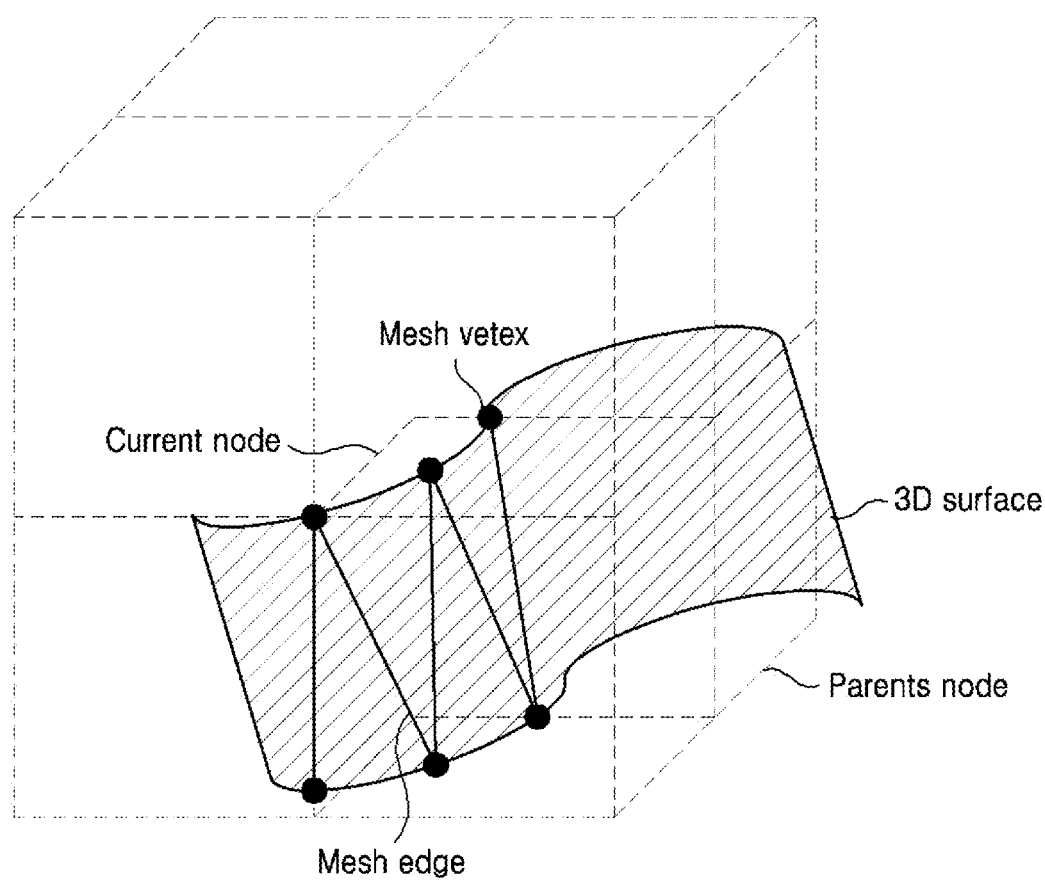
FIG. 4 is a diagram illustrating octree partitioning for a mesh representing a three-dimensional surface.

FIG. 4 is a diagram illustrating octree partitioning for a mesh representing a three-dimensional surface.

The vertex partitioning unit 310 may perform octree partitioning. As shown in the example of FIG. 4, octree partitioning divides a three-dimensional space by eight to generate eight nodes and further divides each node by eight to recursively partition the three-dimensional space. The vertex partitioning unit 310 may partition vertices up to a certain size of nodes according to preset parameters. Furthermore, if at least one vertex does not exist at each node, the node may be no further divided. Information regarding the octree partitioning may be transferred to the mesh decoding device.

The last nodes that hold vertices but are no further being divided may be transferred to the trisoup encoder 320.

The trisoup encoder 320 performs trisoup coding on the inputted nodes. Here, trisoup coding is a method of approximating the three-dimensional surface contained in the node as a plurality of connected triangles for the last node of a cube.

Figure 5:
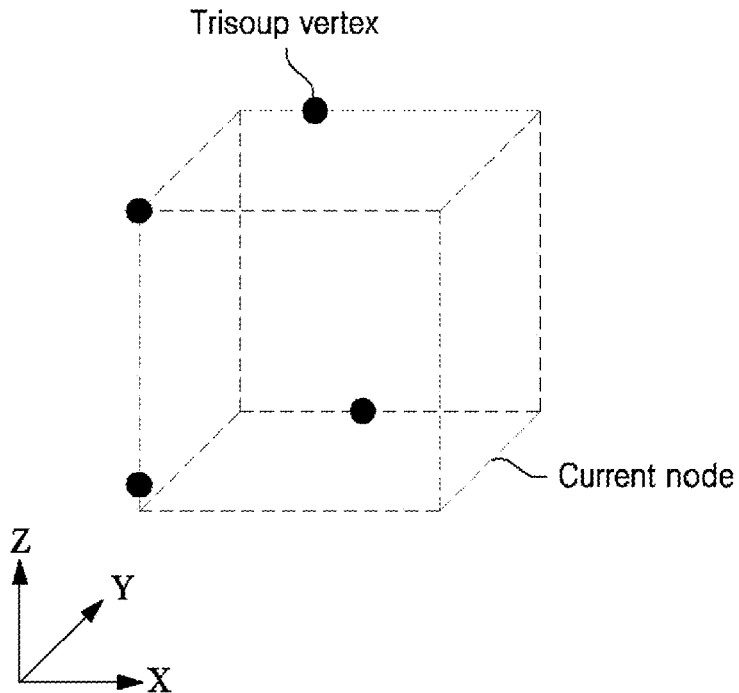
FIG. 5 is a diagram illustrating an approximation of a vertex of a triangle.

First, for the three-dimensional mesh at the current node illustrated in FIG. 4, a point where each of the edges of the cube and the three-dimensional surface meet as illustrated in FIG. 5 may be determined as the vertex of triangle (trisoup vertex). In this case, existing mesh vertices may be omitted so that only some of the existing mesh vertices are present at the edges. The information about the edges holding the vertices may be transmitted, after entropy encoding is applied, to the mesh decoding device. Additionally, the position of the vertex on each edge may be transmitted, after entropy encoding is applied, to the mesh decoding device. In this case, the positions of the edges may be quantized based on preset parameter values. Further, the triangle vertices may be reconstructed for the subsequent encoding process.

Figure 6:
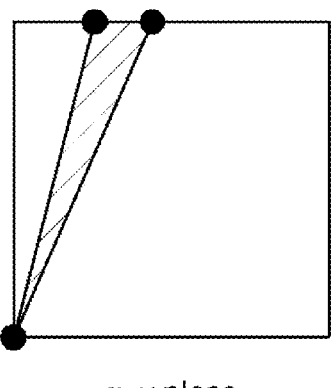
FIG. 6 is a diagram illustrating planar projections of vertices, according to at least one embodiment of the present disclosure.
Figure 6:
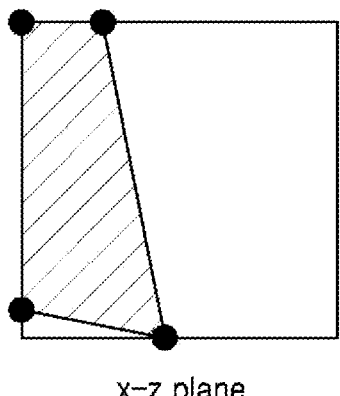
Figure 6:
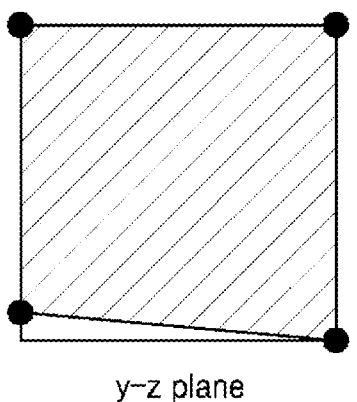

FIG. 6 is a diagram illustrating planar projections of vertices, according to at least one embodiment of the present disclosure.

A plurality of triangles may then be generated by using the reconstructed vertices. At this time, to generate connected triangles that are similar to curved surfaces of the three-dimensional surface, a representative plane of the three-dimensional surface may be determined by using the triangle vertices. A plurality of triangles may be generated by connecting the vertices based on the determined plane. As a method of determining the representative plane, the vertices may be projected to the x-y, x-z, and y-z planes as shown in the example of FIG. 6, and then the representative plane may be determined based on the areas of the polygons generated from the vertices. In the example of FIG. 6, among the generated polygons, the polygon projected to the y-z plane has the largest area. Therefore, the representative plane may be determined to be y-z.

Figure 7:
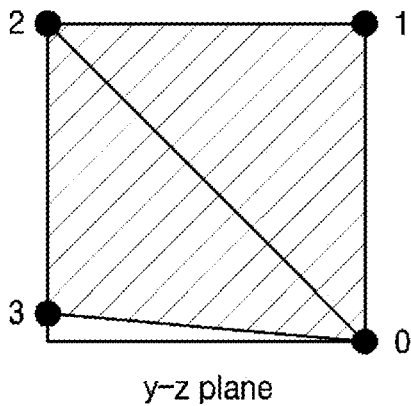
FIG. 7 is a diagram illustrating triangles generated from a representative plane, according to at least one embodiment of the present disclosure.
Figure 7:
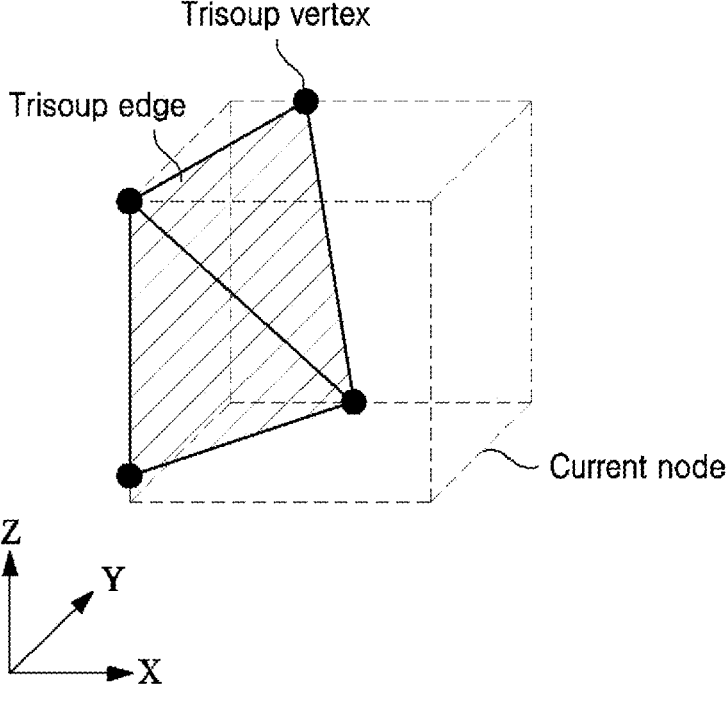

FIG. 7 is a diagram illustrating triangles generated from a representative plane, according to at least one embodiment of the present disclosure.

As shown in the example of FIG. 7, if the number of vertices is 4, a total of 2 triangles may be reconstructed. For each vertex, an ordering may be given, and connected triangles may be reconstructed according to the order 0-1-2, 0-2-3, and so on. For example, the three-dimensional surface at the current node illustrated in FIG. 4 may be approximated as two reconstructed triangles, as illustrated in FIG. 7.

The trisoup encoder 320 may transfer the information used in the trisoup coding for the current node to the texture map generator 330. Further, the trisoup encoder 320 may entropy-encode the triangle vertex information and edge information and thereby may generate a geometry bitstream. The geometry bitstream may be transferred to the bitstream synthesizer 130.

Figure 8:
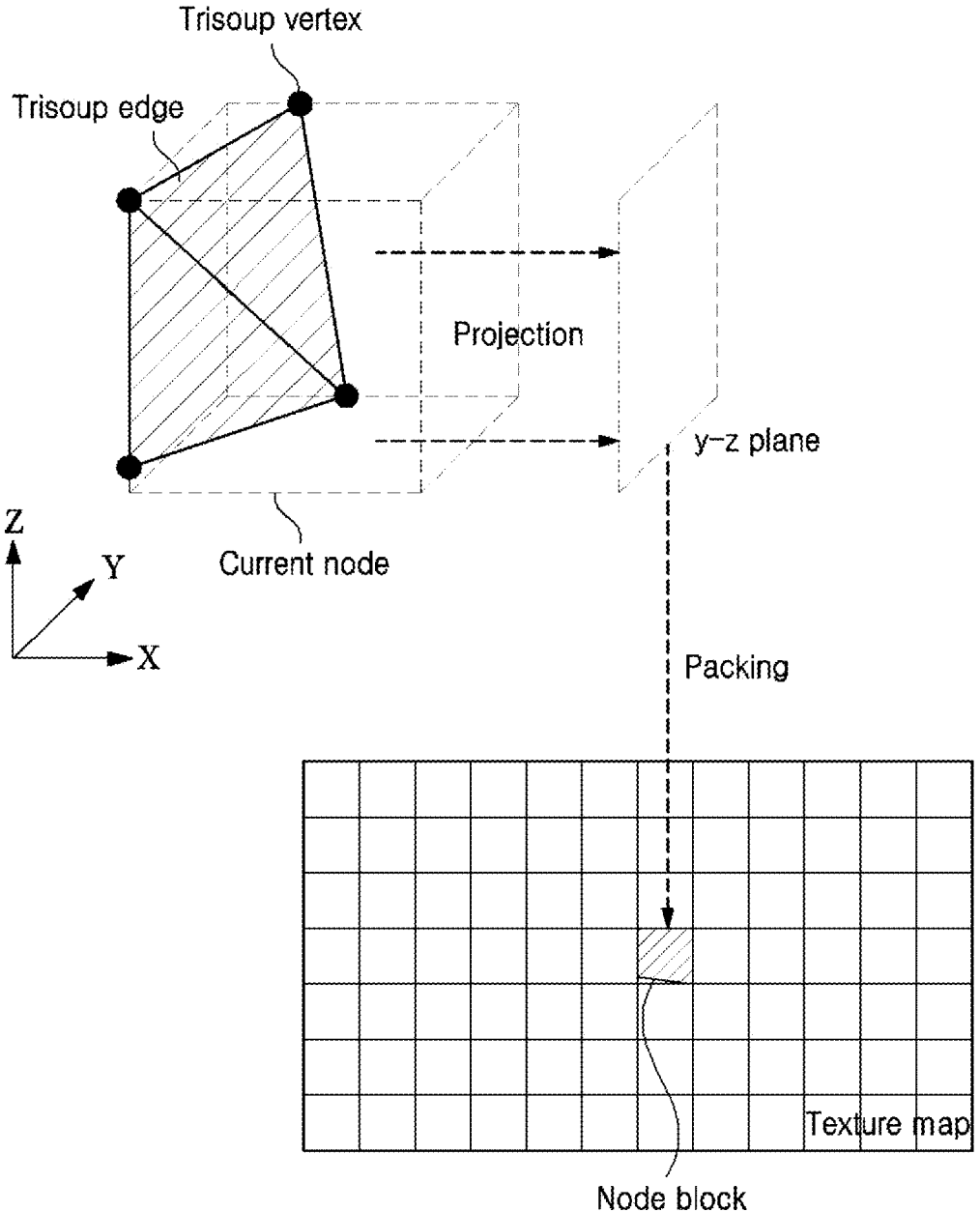
FIG. 8 is a diagram illustrating the generation of a texture map, according to at least one embodiment of the present disclosure.

FIG. 8 is a diagram illustrating the generation of a texture map, according to at least one embodiment of the present disclosure.

The texture map generator 330 uses the reconstructed edge information, reconstructed vertex information, and reconstructed representative plane information received from the trisoup encoder 320 to generate patches by projecting a plurality of approximated reconstructed triangles onto the representative plane, as shown in the example of FIG. 8. Then, the texture map generator 330 packs the projected patches into a node block of the texture map. The patches may include attribute values of the projected vertices.

Node blocks may be assigned to nodes that hold vertices among the last nodes of the octree. The texture map generator 330 may sequentially order the node blocks according to the scanning order of the octree and whether the octree nodes are occupied or not, and may accordingly generate texture map coordinates in the uv domain for the projected vertices included in the patch. For example, the mesh decoding device may locate the node blocks from the octree nodes based on the octree partitioning information, and then may reconstruct the relevant texture information. Meanwhile, the generated texture map may be transferred to the video preprocessor 340.

The video preprocessor 340 may preprocess the inputted texture map. In this case, the preprocessing may be a padding process to fill the void in the generated texture map. In this case, the padding may be performed by using the most adjacent pixel. Alternatively, the padding may be performed by using an intermediate value of the bit depth utilized by the video encoder 350. Alternatively, push-pull padding may be used. The preprocessed texture map may be transferred to the video encoder 350.

Here, the push-pull padding method performs a hierarchical down-sampling of the target frame (in this disclosure, the texture map), performs a hierarchical up-sampling, and then combines the foreground region with the up-sampled background region of the same hierarchy. The push-pull padding method can increase video coding efficiency by smoothing the edge regions caused by the foreground texture packed on a patch-by-patch basis.

The video encoder 350 may video-encode the inputted preprocessed texture map to generate an attribute bitstream. In the process, the video encoder 350 may use a video encoding technology such as H.264/AVC, H.265/HEVC, H.266/VVC, VP8, VP9, AV1, or the like. The generated attribute bitstream may be transferred to the bitstream synthesizer 130.

The bitstream synthesizer 130 may concatenate all of the received bitstreams to generate one final bitstream.

As described above, according to this embodiment, by encoding the vertices of the mesh by using octree-based trisoup coding and encoding the attribute information based on the information used in the trisoup coding, the encoding unit of the geometry information may be equal to that of the attribute information.

Figure 9:
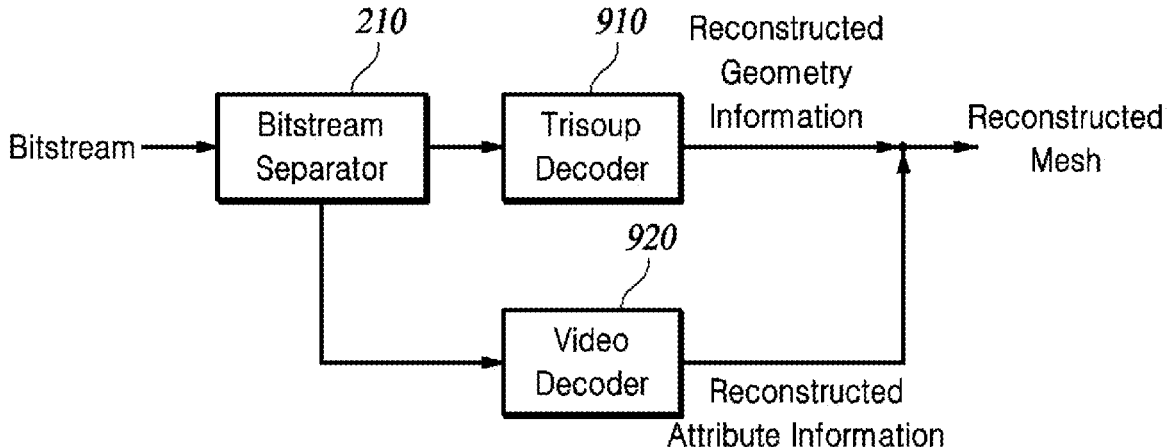
FIG. 9 is a diagram illustrating a mesh decoding device using trisoup coding, according to at least one embodiment of the present disclosure.

FIG. 9 is a diagram illustrating a mesh decoding device using trisoup coding, according to at least one embodiment of the present disclosure.

A mesh decoding device according to at least one embodiment of the present disclosure receives a bitstream and reconstructs a three-dimensional mesh from the bitstream by using trisoup coding. The mesh decoding device may include all or part of the bitstream separator 210, a trisoup decoder 910, and a video decoder 920.

The bitstream separator 210 receives and then separates the bitstream inputted into a geometry bitstream and an attribute bitstream. The geometry bitstream may be transferred to the trisoup decoder 910. The attribute bitstream may be transferred to the video decoder 920.

The trisoup decoder 910 decodes the received geometry bitstream to reconstruct the geometry information of the mesh. First, the trisoup decoder 910 may reconstruct the octree structure based on the octree partitioning information. Further, the trisoup decoder 910 may reconstruct the vertices at the last node of the octree based on the information of the edges containing the vertices and the position information of the vertices. Further, the trisoup decoder 910 may use the reconstructed vertices to determine a representative plane in the same way as in the mesh encoding device by the trisoup encoder 320. The trisoup decoder 910 may generate connection information of the trisoup mesh by reconstructing a plurality of connected triangles by using the representative plane. Further, the texture map coordinates in the uv domain of the vertices may be reconstructed based on the positions of the node blocks of the texture map according to the octree structure. In other words, the geometry information of the mesh, which is the coordinate information of the vertices, the connection information of the trisoup mesh, and the coordinate information of the texture map may be reconstructed in the form of a string and subsequently outputted together with the texture map to be reconstructed.

The video decoder 920 decodes the inputted attribute bitstream to reconstruct the texture map as attribute information. As described above, the video decoder 920 may locate a node block from the octree nodes based on the octree partitioning information, and then may reconstruct the relevant texture information. The mesh decoding device may reconstruct the mesh by combining the connection information of the trisoup mesh, which is the coordinate information of the vertices, the coordinate information of the texture map, and the texture information.

Hereinafter, with reference to FIGS. 10 and 11, a mesh encoding/decoding method utilizing trisoup coding is described.

Figure 10:
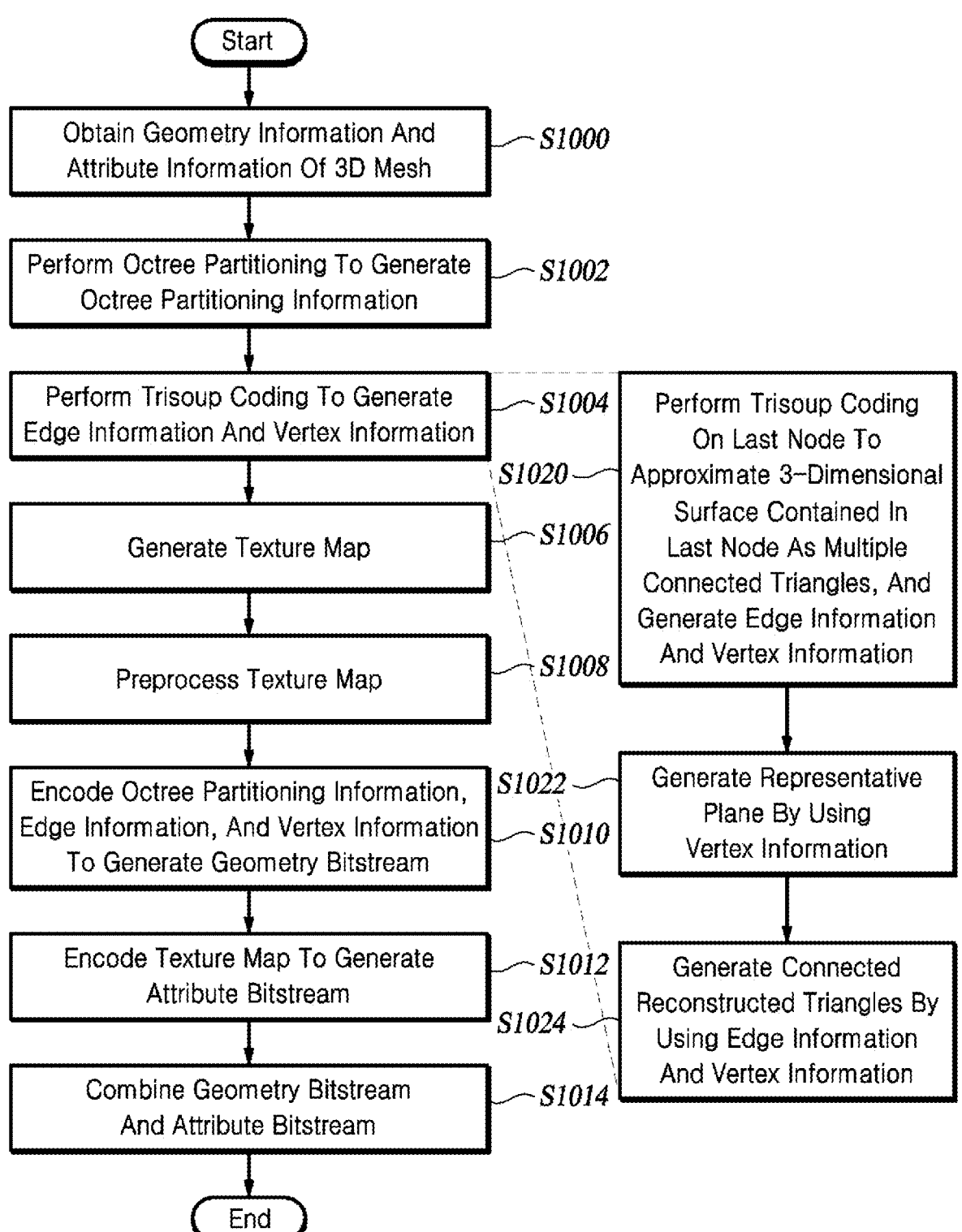
FIG. 10 is a flowchart of a mesh encoding method utilizing trisoup coding, performed by a mesh encoding device, according to at least one embodiment of the present disclosure.

FIG. 10 is a flowchart of a mesh encoding method utilizing trisoup coding, performed by a mesh encoding device, according to at least one embodiment of the present disclosure.

The mesh encoding device obtains geometry information and attribute information of a three-dimensional mesh (S1000).

The mesh encoding device performs octree partitioning on the three-dimensional coordinates of the vertices from the geometry information to generate octree partitioning information (S1002).

Here, the octree partitioning generates eight nodes by dividing the three-dimensional space by eight and then divides the three-dimensional space recursively by further dividing each node by eight, to generate an octree containing the last nodes that are no further divided. Here, each node of the octree is a cube.

For the last node of the octree, the mesh encoding device performs trisoup coding to generate edge information and vertex information (S1004). Here, the edge information indicates the edges of the node at which the vertices exist, and the vertex information indicates the positions of the vertices at the edges.

In the steps described above, trisoup coding may be performed as follows.

The mesh encoding device performs trisoup coding on the last node to approximate the three-dimensional surface included in the last node as a plurality of connected triangles and generates edge information and vertex information (S1020). The mesh encoding device may determine the points where the edges of the last nodes meet with the three-dimensional surface of the mesh to be vertices of the connected triangles.

The mesh encoding device uses the vertex information to generate a representative plane (S1022). The mesh encoding device may project the vertices according to the vertex information into the x-y, x-z, and y-z planes, and then may determine the representative plane based on the areas of the polygons generated from the projected vertices.

The mesh encoding device generates connected reconstructed triangles by using the representative plane, edge information, and vertex information (S1024). The mesh encoding device may assign an order to the vertices associated with the representative plane, and may generate the reconstructed triangles according to the assigned order.

The mesh encoding device then generates a texture map (S1006).

The mesh encoding device may use, for the last node, the octree partitioning information, edge information, and vertex information to generate patches of attribute information, and then may pack the patches into the node block and thereby may generate the texture map. The mesh encoding device may generate patches of the attribute information by projecting the reconstructed triangles onto the representative plane by using the edge information, the vertex information, and the representative plane. At this time, the mesh encoding device may sequentially order the node blocks according to the scan order of the octree and whether the nodes of the octree are occupied or not, and may generate texture map coordinates for the vertices included in the patches.

The mesh encoding device preprocesses the texture map (S1008). The preprocessing step may be a padding process to fill in voids in the texture map.

The mesh encoding device encodes the octree partitioning information, edge information, and vertex information to generate a geometry bitstream (S1010).

The mesh encoding device encodes a texture map by using a video encoding method to generate an attribute bitstream (S1012).

The mesh encoding device combines the geometry bitstream and the attribute bitstream to generate a final bitstream (S1014).

Figure 11:
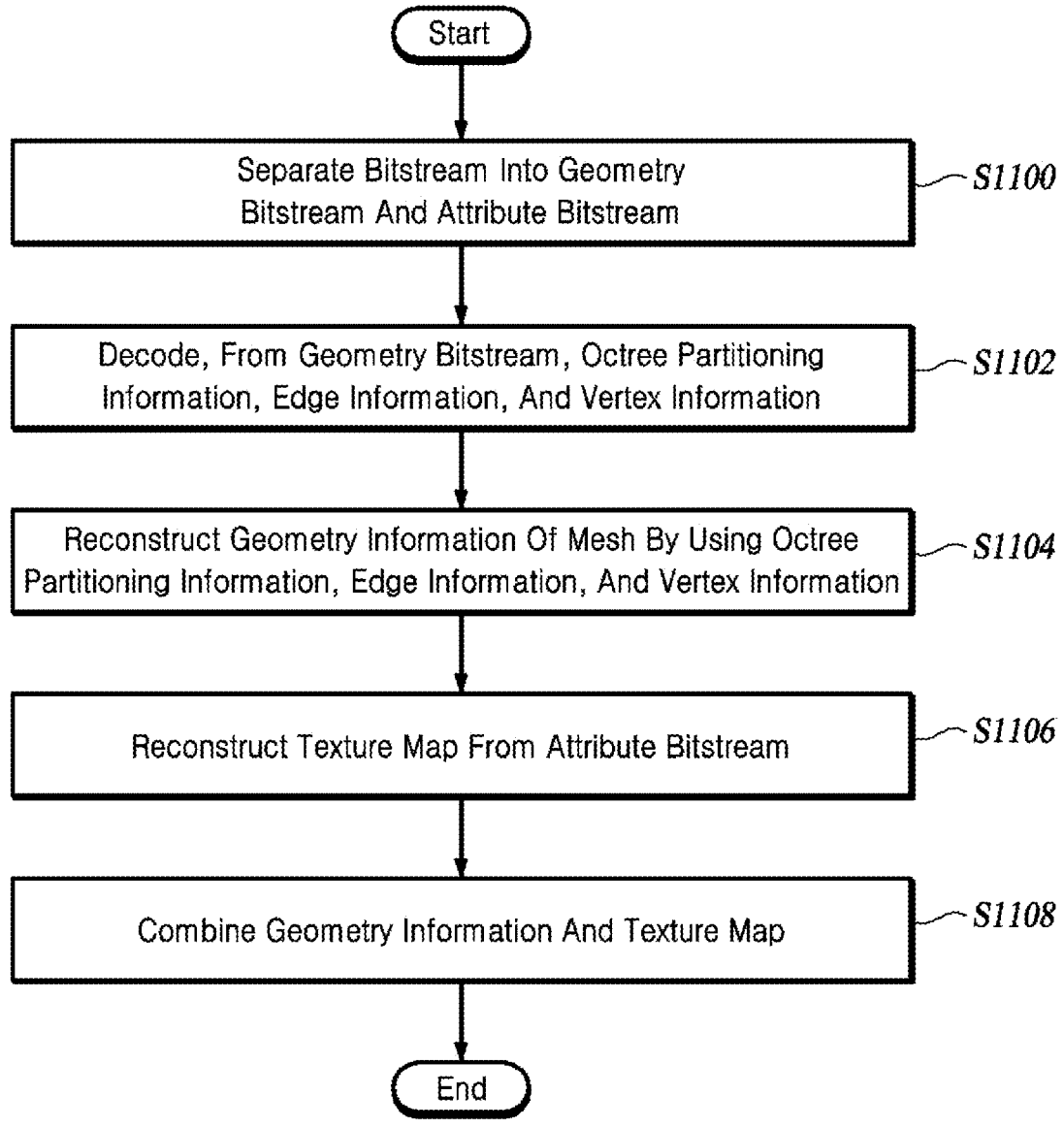
FIG. 11 is a flowchart of a mesh decoding method utilizing trisoup coding, performed by a mesh decoding device, according to at least one embodiment of the present disclosure.

FIG. 11 is a flowchart of a mesh decoding method utilizing trisoup coding, performed by a mesh decoding device, according to at least one embodiment of the present disclosure.

The mesh decoding device separates the bitstream into a geometry bitstream and an attribute bitstream (S1100).

The mesh decoding device decodes, from the geometry bitstream, octree partitioning information, edge information, and vertex information (S1102).

Here, the octree partitioning information is generated, by the mesh encoding device, by performing octree partitioning on the three-dimensional coordinates of the vertices from the geometry information of the mesh. The octree partitioning generates eight nodes by dividing the three-dimensional space by eight and then divides the three-dimensional space recursively by further dividing each node by eight, thereby generating an octree containing the last nodes that are no further divided. In this case, each node is a cube.

The edge information represents the edges of the node where vertices exist, and the vertex information represents the positions of the vertices at the edges. The edge information and the vertex information are generated by the mesh encoding device by applying trisoup coding to the last node.

The mesh decoding device uses the octree partitioning information, the edge information, and the vertex information to reconstruct the geometry information of the mesh (S1104). The geometry information includes the vertices at the last node of the octree, the connection information of the mesh, and the texture map coordinates.

The mesh decoding device reconstructs the vertices at the last node based on the octree partitioning information, edge information, and vertex information.

The mesh decoding device may use the reconstructed vertices to generate a representative plane, and then may use the representative plane, edge information, and vertex information to generate connected reconstructed triangles, thereby generating connection information of the mesh.

The mesh decoding device may reconstruct the texture map coordinates of the reconstructed vertices based on the positions of the node blocks in the texture map according to the octree partitioning information.

The mesh decoding device may reconstruct the texture map from the attribute bitstream by using a video decoding method (S1106).

Further, the mesh decoding device may post-process the reconstructed texture map. Here, the post-processing may be the inverse of the pre-processing performed by the mesh encoding device.

The mesh decoding device synthesizes a mesh by combining the geometry information and the texture map (S1108).

Although the steps in the respective flowcharts are described to be sequentially performed, the steps merely instantiate the technical idea of some embodiments of the present disclosure. Therefore, a person having ordinary skill in the art to which this disclosure pertains could perform the steps by changing the sequences described in the respective drawings or by performing two or more of the steps in parallel. Hence, the steps in the respective flowcharts are not limited to the illustrated chronological sequences.

It should be understood that the above description presents illustrative embodiments that may be implemented in various other manners. The functions described in some embodiments may be realized by hardware, software, firmware, and/or their combination. It should also be understood that the functional components described in the present disclosure are labeled by " . . . unit" to strongly emphasize the possibility of their independent realization.

Meanwhile, various methods or functions described in some embodiments may be implemented as instructions stored in a non-transitory recording medium that can be read and executed by one or more processors. The non-transitory recording medium may include, for example, various types of recording devices in which data is stored in a form readable by a computer system. For example, the non-transitory recording medium may include storage media, such as erasable programmable read-only memory (EPROM), flash drive, optical drive, magnetic hard drive, and solid state drive (SSD) among others.

Although embodiments of the present disclosure have been described for illustrative purposes, those having ordinary skill in the art to which this disclosure pertains should appreciate that various modifications, additions, and substitutions are possible, without departing from the idea and scope of the present disclosure. Therefore, embodiments of the present disclosure have been described for the sake of brevity and clarity. The scope of the technical idea of the embodiments of the present disclosure is not limited by the illustrations. Accordingly, those having ordinary skill in the art to which the present disclosure pertains should understand that the scope of the present disclosure should not be limited by the above explicitly described embodiments but by the claims and equivalents thereof.

The invention claimed is:

1. A method performed by a mesh decoding device for decoding a mesh that is three-dimensional, the method comprising:

separating a bitstream into a geometry bitstream and an attribute bitstream;

decoding edge information, vertex information, and octree partitioning information from the geometry bitstream, wherein the octree partitioning information is generated by a mesh encoding device performing octree partitioning on three-dimensional coordinates of vertices contained in geometry information of the mesh, wherein the octree partitioning includes dividing a three-dimensional space by eight to produce eight nodes, and recursively dividing the three-dimensional space by further dividing each of the eight nodes, which is a cube, by eight to produce an octree comprising last nodes that are not further divided;

reconstructing the geometry information of the mesh by using the octree partitioning information, the edge information, and the vertex information, wherein the geometry information includes vertices at the last nodes of the octree, connection information of the mesh, and texture map coordinates;

reconstructing a texture map from the attribute bitstream by using a video decoding method; and synthesizing the mesh by combining the geometry information and the texture map.

2. The method of claim 1, wherein the edge information indicates edges of a node that holds the vertices, and the vertex information indicates positions of vertices that exist at the edges, wherein the edge information and the vertex information are generated by applying trisoup coding to the last nodes by the mesh encoding device.

3. The method of claim 1, wherein reconstructing the geometry information includes:

reconstructing the vertices at the last nodes based on the octree partitioning information, the edge information, and the vertex information.

4. The method of claim 3, wherein reconstructing the geometry information generates the connection information of the mesh by including:

generating a representative plane by using reconstructed vertices; and generating reconstructed triangles connected by using the representative plane, the edge information, and the vertex information.

5. The method of claim 4, wherein generating the representative plane includes:

projecting vertices according to the vertex information into x-y, x-z, and y-z planes, and then determining the representative plane based on areas of polygons generated from projected vertices.

6. The method of claim 3, wherein reconstructing the geometry information includes:

reconstructing texture map coordinates of the reconstructed vertices based on a position of a node block in the texture map according to the octree partitioning information.

7. A method performed by a mesh encoding device for encoding a mesh that is three-dimensional, the method comprising:

obtaining geometry information and attribute information of the mesh;

generating octree partitioning information by performing octree partitioning on three-dimensional coordinates of vertices contained in the geometry information, wherein the octree partitioning includes dividing a three-dimensional space by eight to produce eight nodes, and recursively dividing the three-dimensional space by further dividing each of the eight nodes, which is a cube, by eight to produce an octree comprising last nodes that are not further divided;

performing trisoup coding on the last nodes of the octree and then generating edge information and vertex information; and for the last nodes, generating patches of the attribute information by using the octree partitioning information, the edge information, and the vertex information, and then packing the patches into node blocks in a texture map.

8. The method of claim 7, wherein the edge information indicates edges of a node that holds the vertices, and the vertex information indicates positions of vertices that exist at the edges.

9. The method of claim 7, further comprising:

preprocessing the texture map, wherein preprocessing the texture map includes a padding process for filling in voids in the texture map.

10. The method of claim 7, further comprising:

generating a geometry bitstream by encoding the octree partitioning information, the edge information, and the vertex information;

generating an attribute bitstream by encoding the texture map by using a video encoding method; and combining the geometry bitstream and the attribute bitstream.

11. The method of claim 7, wherein generating the vertex information includes:

performing the trisoup coding on the last nodes to approximate a three-dimensional surface contained in the last nodes as a plurality of connected triangles, and then generating the edge information and the vertex information;

generating a representative plane by using the vertex information; and generating reconstructed triangles connected by using the representative plane, the edge information, and the vertex information.

12. The method of claim 11, wherein generating the vertex information includes:

determining points where edges of the last nodes meet with a three-dimensional surface of the mesh to be vertices of the connected triangles.

13. The method of claim 11, wherein generating the representative plane includes:

projecting vertices according to the vertex information into x-y, x-z, and y-z planes, and then determining the representative plane based on areas of polygons generated from projected vertices.

14. The method of claim 11, wherein generating the reconstructed triangles comprises:

assigning an order to vertices associated with the representative plane, and generating the reconstructed triangles according to the order.

15. The method of claim 11, wherein packing the patches includes:

generating the patches of the attribute information by projecting the reconstructed triangles onto the representative plane by using the edge information, the vertex information, and the representative plane.

16. The method of claim 7, wherein packing the patches includes:

sequentially ordering the node blocks according to a scan order of the octree and occupancy or non-occupancy of nodes of the octree, and generating texture map coordinates for vertices included in the patches.

17. A computer-readable recording medium storing a bitstream generated by a mesh encoding method, the mesh encoding method comprising:

obtaining geometry information and attribute information of a mesh that is three-dimensional;

generating octree partitioning information by performing octree partitioning on three-dimensional coordinates of vertices contained in the geometry information, wherein the octree partitioning includes dividing a three-dimensional space by eight to produce eight nodes, and recursively dividing the three-dimensional space by further dividing each of the eight nodes, which is a cube, by eight to produce an octree comprising last nodes that are not further divided;

performing trisoup coding on the last nodes of the octree and then generating edge information and vertex information; and for the last nodes, generating patches of the attribute information by using the octree partitioning information, the edge information, and the vertex information, and then packing the patches into node blocks in a texture map.

\* \* \* \* \*